United States Patent
Osaki et al.

(10) Patent No.: US 9,885,564 B2
(45) Date of Patent: Feb. 6, 2018

(54) OPTICAL COORDINATE MEASURING DEVICE

(71) Applicant: Keyence Corporation, Osaka (JP)

(72) Inventors: Michio Osaki, Osaka (JP); Tadashi Hashimoto, Osaka (JP); Masayasu Ikebuchi, Osaka (JP); Ko Endo, Osaka (JP)

(73) Assignee: Keyence Corporation, Osaka (JP)

( * ) Notice: Subject to any disclaimer, the term of this patent is extended or adjusted under 35 U.S.C. 154(b) by 217 days.

(21) Appl. No.: 14/631,875

(22) Filed: Feb. 26, 2015

(65) Prior Publication Data
US 2015/0276389 A1  Oct. 1, 2015

(30) Foreign Application Priority Data

Mar. 28, 2014 (JP) .................. 2014-069857
May 27, 2014 (JP) .................. 2014-109545

(51) Int. Cl.
| | | |
|---|---|---|
| G01R 27/26 | (2006.01) | |
| G01B 11/25 | (2006.01) | |
| G01B 9/00 | (2006.01) | |
| G01C 11/00 | (2006.01) | |
| G01B 5/008 | (2006.01) | |
| G01B 11/00 | (2006.01) | |

(52) U.S. Cl.
CPC ............ *G01B 11/254* (2013.01); *G01B 5/008* (2013.01); *G01B 9/00* (2013.01); *G01B 11/002* (2013.01); *G01C 11/00* (2013.01)

(58) Field of Classification Search
CPC ....... G01B 11/00; G01B 11/02; G01B 11/026; G01B 11/03; G01B 11/04; G01B 11/24
See application file for complete search history.

(56) References Cited

U.S. PATENT DOCUMENTS

| 4,876,727 | A | * | 10/1989 | Maurer | ................. | G01B 17/06 |
| | | | | | | 348/129 |
| 5,440,392 | A | * | 8/1995 | Pettersen | ............... | G01B 11/00 |
| | | | | | | 356/601 |
| 5,805,287 | A | | 9/1998 | Pettersen et al. | | |
| 5,973,788 | A | | 10/1999 | Pettersen et al. | | |
| 6,064,060 | A | * | 5/2000 | Konada | ................. | B82Y 20/00 |
| | | | | | | 250/234 |
| 6,166,809 | A | * | 12/2000 | Pettersen | ............... | G01C 15/00 |
| | | | | | | 356/612 |
| 6,389,158 | B1 | | 5/2002 | Pettersen et al. | | |

(Continued)

*Primary Examiner* — Tung X Nguyen
*Assistant Examiner* — Dominic Hawkins
(74) *Attorney, Agent, or Firm* — Kilyk & Bowersox, P.L.L.C.

(57) ABSTRACT

Provided is an optical coordinate measuring device with improved measurement efficiency. A holding part of a measurement head includes an installation part and a stand part. The installation part has a horizontal flat shape and is installed on the installation surface. The stand part is provided so as to extend upward from one end of the installation part. The placement table is provided at the other end of the installation part. A measurement target is placed on the placement table. A main imaging unit is provided on an upper part of the stand part. The main imaging unit is arranged so as to be turned obliquely downward such that it can capture an image of a previously set imaging region above the placement table.

11 Claims, 15 Drawing Sheets

(56) References Cited

U.S. PATENT DOCUMENTS

| | | | | |
|---|---|---|---|---|
| 6,603,239 B1* | 8/2003 | Michely | | B23Q 1/34 310/328 |
| 6,822,749 B1* | 11/2004 | Christoph | | G01B 11/007 33/503 |
| 7,718,985 B1* | 5/2010 | Bernath | | H05G 2/003 250/492.2 |
| 8,320,709 B2* | 11/2012 | Aratani | | G06K 9/3216 345/633 |
| 8,874,406 B2 | 10/2014 | Rotvold et al. | | |
| 2003/0034453 A1* | 2/2003 | Ookubo | | B82Y 35/00 850/58 |
| 2005/0015005 A1* | 1/2005 | Kockro | | A61B 90/36 600/427 |
| 2006/0097162 A1* | 5/2006 | Maruyama | | G01Q 10/04 250/309 |
| 2008/0249741 A1* | 10/2008 | Hon | | G05B 19/401 702/168 |
| 2011/0288803 A1* | 11/2011 | Sonda | | G01B 11/2509 702/84 |
| 2012/0246904 A1* | 10/2012 | Luepke | | G01B 11/002 29/428 |
| 2013/0027716 A1* | 1/2013 | Melkis | | G06F 3/03543 356/614 |
| 2013/0094706 A1* | 4/2013 | Nakazato | | G01B 11/24 382/103 |
| 2014/0018769 A1* | 1/2014 | Alnafisah | | A61D 7/00 604/506 |
| 2015/0276377 A1* | 10/2015 | Ikebuchi | | G01B 5/008 356/616 |

* cited by examiner

OPTICAL COORDINATE MEASURING DEVICE

CROSS-REFERENCE TO RELATED APPLICATIONS

The present application claims foreign priority based on Japanese Patent Application No. 2014-109545, filed May 27, 2014, and No. 2014-069857, filed Mar. 28, 2014, the contents of which is incorporated herein by reference.

BACKGROUND OF THE INVENTION

1. Field of the Invention

The present invention relates to an optical coordinate measuring device using a contact-type probe.

2. Description of Related Art

A contact-type coordinate measuring device is provided with a probe having a contact part. The contact part of the probe is brought into contact with a measurement target, and coordinates of a contact position between the measurement target and the contact part are calculated. By calculating coordinates of a plurality of positions on the measurement target, a size of a desired portion of the measurement target is measured.

JP 06-511555 A describes a system for point by point measurement of spatial coordinates, which includes a data processor, a contact probe, and an angle sensor. The contact probe is provided with a plurality of point light sources in addition to a contact point. The angle sensor is provided so as to allow observation of an essential portion of a measurement target and allow observation of the plurality of point light sources of the contact probe.

A spatial direction from the angle sensor toward each light source is recorded. Based on the recorded spatial direction, a position and an orientation of the contact probe with respect to the angle sensor are calculated by a data processor. The position of the contact probe and a position of the contact point are associated with a position of the measurement target.

In the system for point by point measurement in JP 06-511555 A, it is necessary to fix the angle sensor by use of a fixing tool such as a tripod so as to allow observation of the target and the plurality of point light sources of the contact probe. Hence, it is possible to efficiently measure a shape of a relatively large-sized measurement target. However, in the case of measuring a shape of a relatively small-sized measurement target, performing a procedure of preparing the fixing tool, fixing the angle sensor, and the like causes deterioration in measurement efficiency. Further, when an attempt is made to realize high measurement accuracy such as several μm to several tens of μm by means of an optical measuring device, a measurement target range is relatively restricted. This makes adjustment of the fixing tool such as the tripod to take time or makes it hard for a user to recognize the measurement target range. These also become the cause of deterioration in measurement efficiency.

SUMMARY OF THE INVENTION

An object of the present invention is to provide an optical coordinate measuring device with improved measurement efficiency.

(1) An optical coordinate measuring device according to the present invention includes: a placement table on which a measurement target is placed; a probe which has a plurality of markers and has a contact part to be brought into contact with the measurement target; an imaging unit which captures images of the plurality of markers of the probe, to generate image data corresponding to the images of the plurality of markers; a calculation unit which calculates coordinates of a contact position between the measurement target and the contact part based on the image data generated by the imaging unit; and a holding part which integrally holds the imaging unit and the placement table such that an image of a region above the placement table is captured by the imaging unit.

In this optical coordinate measuring device, the contact part of the probe is brought into contact with the measurement target placed on the placement table. Images of the plurality of markers of the probe are captured by the imaging unit, to thereby generate image data. Based on the image data, coordinates of a contact position between the measurement target and the contact part are calculated by the calculation unit. Hence, it is possible to measure a size of a desired portion of the measurement target.

The imaging unit and the placement table are integrally held by the holding part such that an image of a region above the placement table is captured by the imaging unit. Accordingly, handling of the optical coordinate measuring device becomes easy as compared to a case where the imaging unit and the placement table are provided as separate bodies. Further, a fixing tool for fixing the imaging unit is not required to be separately prepared. This improves efficiency of measurement performed by the optical coordinate measuring device.

(2) The imaging unit may be arranged obliquely above the placement table.

In this case, it is possible to capture an image of a wide range of region above the placement table while suppressing an increase in size of the optical coordinate measuring device. Further, the imaging unit is prevented from obstructing movement of the probe.

(3) The probe may have a grip part which is provided so as to extend in a first direction and is gripped by a user, and a body part which is provided at an upper end of the grip part so as to extend in a second direction, the second direction forming an angle with respect to the first direction, and the plurality of markers may be provided on an upper surface of the body part.

In this case, the user can easily turn the upper surface of the body part to the imaging unit while gripping the grip part. Accordingly, images of the plurality of markers, provided on the upper surface of the body part, can be easily captured by the imaging unit.

(4) The optical coordinate measuring device may further include a display unit which is provided so as to be held by the holding part, and displays a result of calculation by the calculation unit.

In this case, a result of calculation by the calculation unit can be easily checked without separately preparing a display unit.

(5) The placement table may be configured such that a fixing tool for fixing the measurement target can be attached to the placement table.

In this case, fixing the measurement target to the placement table by use of the fixing tool prevents positional displacement of the measurement target. Hence, it is possible to accurately measure a size of the measurement target.

(6) The placement table may have magnetism. In this case, the measurement target can be easily fixed to the placement table.

(7) The placement table may have adhesiveness. In this case, the measurement target can be easily fixed to the placement table.

According to the present invention, the measurement efficiency is improved.

BRIEF DESCRIPTION OF THE DRAWINGS

DETAILED DESCRIPTION OF PREFERRED EMBODIMENTS (1) Configuration of Optical Coordinate Measuring Device FIG. 2 is a perspective view showing a configuration of a measurement head of an optical coordinate measuring device 300 of FIG. 1. FIG. 3 is a perspective view showing a configuration of a probe of a measurement head 100 of FIG. 2. Hereinafter, the optical coordinate measuring device 300 according to the present embodiment will be described with reference to FIGS. 1 to 3. As shown in FIG. 1, the optical coordinate measuring device 300 is provided with the measurement head 100 and a processing device 200. The measurement head 100 includes a holding part 110, a placement table 120, a main imaging unit 130, a probe 140, a sub-imaging unit 150, a display unit 160, an operation unit 170, and a control board 180.

As shown in FIG. 2, the holding part 110 of the measurement head 100 includes an installation part 111 and a stand part 112. The installation part 111 has a horizontal flat shape and is installed on the installation surface. The stand part 112 is provided so as to extend upward from one end of the installation part 111.

The placement table 120 is provided at the other end of the installation part 111. The placement table 120 is an optical surface plate, for example. A measurement target S is placed on the placement table 120. In this example, the placement table 120 has a substantially square shape. On the placement table 120, a plurality of screw holes are formed so as to be arrayed at regular intervals in two directions orthogonal to each other. Hence, it is possible to fix the measurement target S to the placement table 120 by means of a cramp member and fixing screws. The placement table 120 may have magnetism. In this case, it is possible to fix the measurement target S to the placement table 120 by means of a fixing member using a magnet such as a magnet base. Further, the upper surface of the placement table 120 may have adhesiveness. Also in this case, the measurement target S can be easily fixed to the placement table 120. Note that the placement table 120 may be detachably formed. For example, the placement table 120 having an adhesive upper surface may be realized by fixing, by means of screws, a plate member having an adhesive upper surface to the placement table 120 provided with a plurality of screw holes.

Figure 4A:
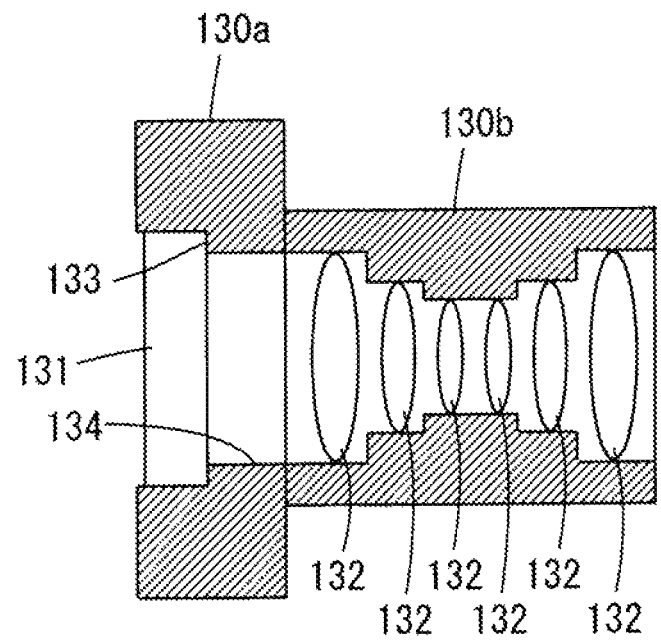
FIGS. 4A and 4B are views for describing a configuration of a main imaging unit.

The main imaging unit 130 is provided on an upper part of the stand part 112. The main imaging unit 130 may be detachably provided on the upper part of the stand part 112, or may be provided integrally with the stand part 112. The main imaging unit 130 includes an imaging element 131 (FIGS. 4A and 4B described later) and a plurality of lenses 132 (FIG. 4A described later). In the present embodiment, the imaging element 131 is a CMOS (complementary metal-oxide-semiconductor) image sensor capable of detecting infrared rays. The main imaging unit 130 is arranged so as to be turned obliquely downward such that it can detect infrared rays emitted from a previously set imaging region V (FIG. 5 described later).

Figure 1:
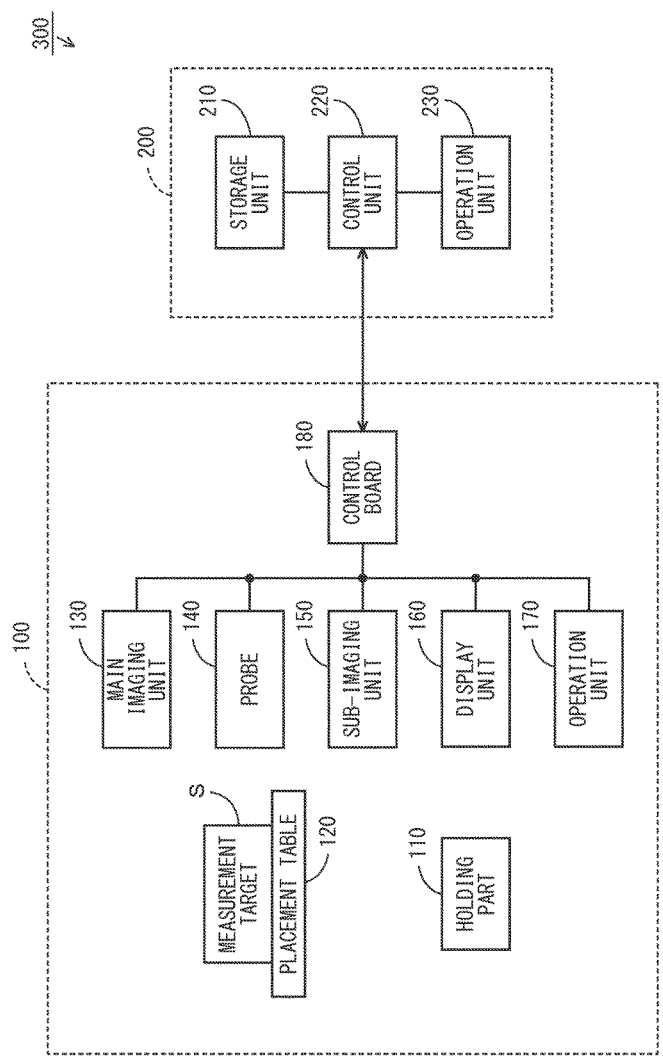
FIG. 1 is a block diagram showing a configuration of an optical coordinate measuring device according to one embodiment of the present invention.

The imaging region V (FIG. 5) is a certain region including the placement table 120 of the installation part 111 and its periphery. In the present embodiment, the placement table 120 of FIG. 1 and a region projecting from the placement table 120 only by a dimension of an overall length of the probe 140 of FIG. 1 are defined as the imaging region V. Note that the overall length of the probe 140 is approximately 150 mm, for example. An analog electric signal (hereinafter referred to as light reception signal) corresponding to a detected amount is outputted from each pixel of the main imaging unit 130 to the control board 180.

Figure 3:
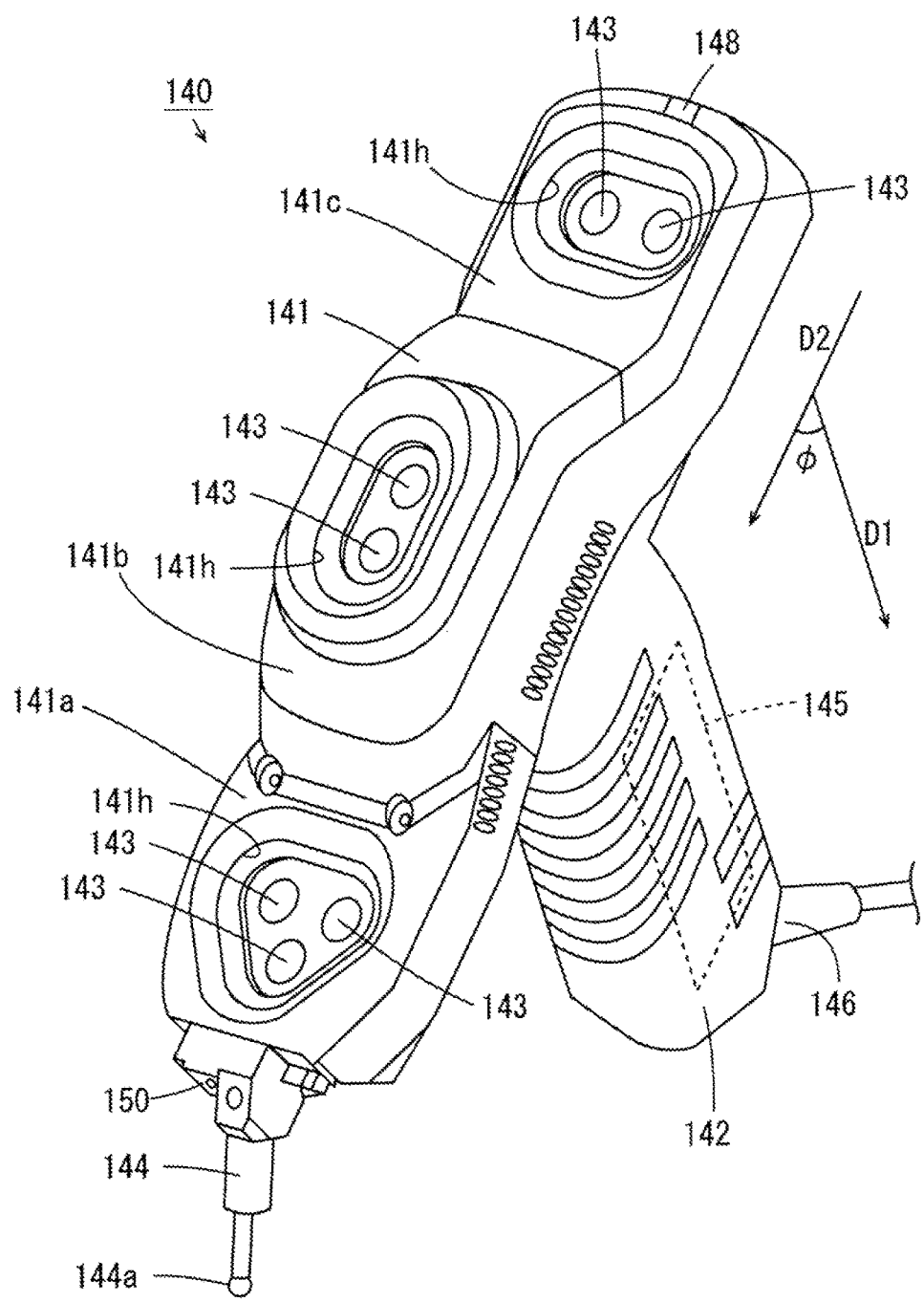
FIG. 3 is a perspective view showing a configuration of a probe of the measurement head of FIG. 2.

As shown in FIG. 3, the probe 140 includes a housing 141, a grip part 142, a plurality of light emitting units 143, a stylus 144, a power supply board 145, a connection terminal 146, and a notification unit 148. The grip part 142 extends in a first direction D1, and the housing 141 extends in a second direction D2 intersecting with the first direction D1. A user grips the grip part 142 and operates the probe 140.

Hereinafter, unless specifically mentioned, the top, bottom, front, and rear of the probe 140 indicate the top, bottom, front, and rear of the probe 140 in a state where the user vertically holds the grip part 142 (state where the first direction D1 is a vertical direction).

The housing 141 is provided at the upper end of the grip part 142. The grip part 142 extends downward from the central part of the lower surface of the housing 141 such that a front portion of the housing 141 projects in front of the grip part 142 and a rear portion of the housing 141 projects behind the grip part 142. Here, an angle formed by the first direction D1 and the second direction D2 is defined as an angle φ formed by the grip part 142 and the front portion of the housing 141. In the present embodiment, the angle φ is an acute angle, being larger than 0° and smaller than 90°.

In the state where the grip part 142 is vertically held, the front end of the housing 141 is located below the rear end of the housing 141, and the upper surface of the housing 141 is inclined obliquely downward from the rear end to the front end. In this case, the user can easily turn the upper surface of the housing 141 obliquely upward.

In the present embodiment, the upper surface of the housing 141 includes a front-part upper surface 141a, a central-part upper surface 141b, and a rear-part upper surface 141c. The front-part upper surface 141a, the central-part upper surface 141b, and the rear-part upper surface 141c are parallel to the second direction D2. Further, the front-part upper surface 141a, the central-part upper surface 141b, and the rear-part upper surface 141c are vertical to a plane including the first and second directions D1, D2. The front-part upper surface 141a and the rear-part upper surface 141c are on the same plane, and the central-part upper surface 141b is on a plane higher than the front-part upper surface 141a and the rear-part upper surface 141c.

A glass-made holding member for holding the plurality of light emitting units 143 is housed inside the housing 141. The housing 141 is provided with a plurality of openings 141h through which the plurality of light emitting units 143 in the housing 141 are exposed.

In the example of FIG. 3, seven light emitting units 143 are provided in the housing 141. Three light emitting units 143 are arranged in the front end of the housing 141, two light emitting units 143 are arranged in the center, and two light emitting units 143 are arranged in the rear end. The front-part upper surface 141a, the central-part upper surface 141b, and the rear-part upper surface 141c of the housing 141 are respectively provided with an opening 141h through which the three light emitting units 143 in the front end are exposed, an opening 141h through which the two light emitting units 143 in the center are exposed, and an opening 141h through which the two light emitting units 143 in the rear end are exposed.

In this example, the three light emitting units 143 in the front end of the housing 141 and the two light emitting units 143 in the rear end are arranged so as to be located on the same plane. Further, the two light emitting units 143 in the center are arranged so as to be located on a plane higher than the plane where the other light emitting units 143 are located.

The three light emitting units 143 in the front end are arranged so as to be exposed upward from the front-part upper surface 141a. The two light emitting units 143 in the center are arranged so as to be exposed upward from the central-part upper surface 141b. The two light emitting units 143 in the rear end are arranged so as to be exposed upward from the rear-part upper surface 141c.

Each light emitting unit 143 includes a plurality of LEDs (light-emitting diodes). In this example, each LED is an infrared LED, and each light emitting unit 143 periodically emits infrared rays with a wavelength of 860 nm. The infrared rays emitted from the plurality of light emitting units 143 pass through the plurality of openings 141h of the housing 141, and images of the infrared rays are captured by the main imaging unit 130 of FIG. 2.

Figure 2:
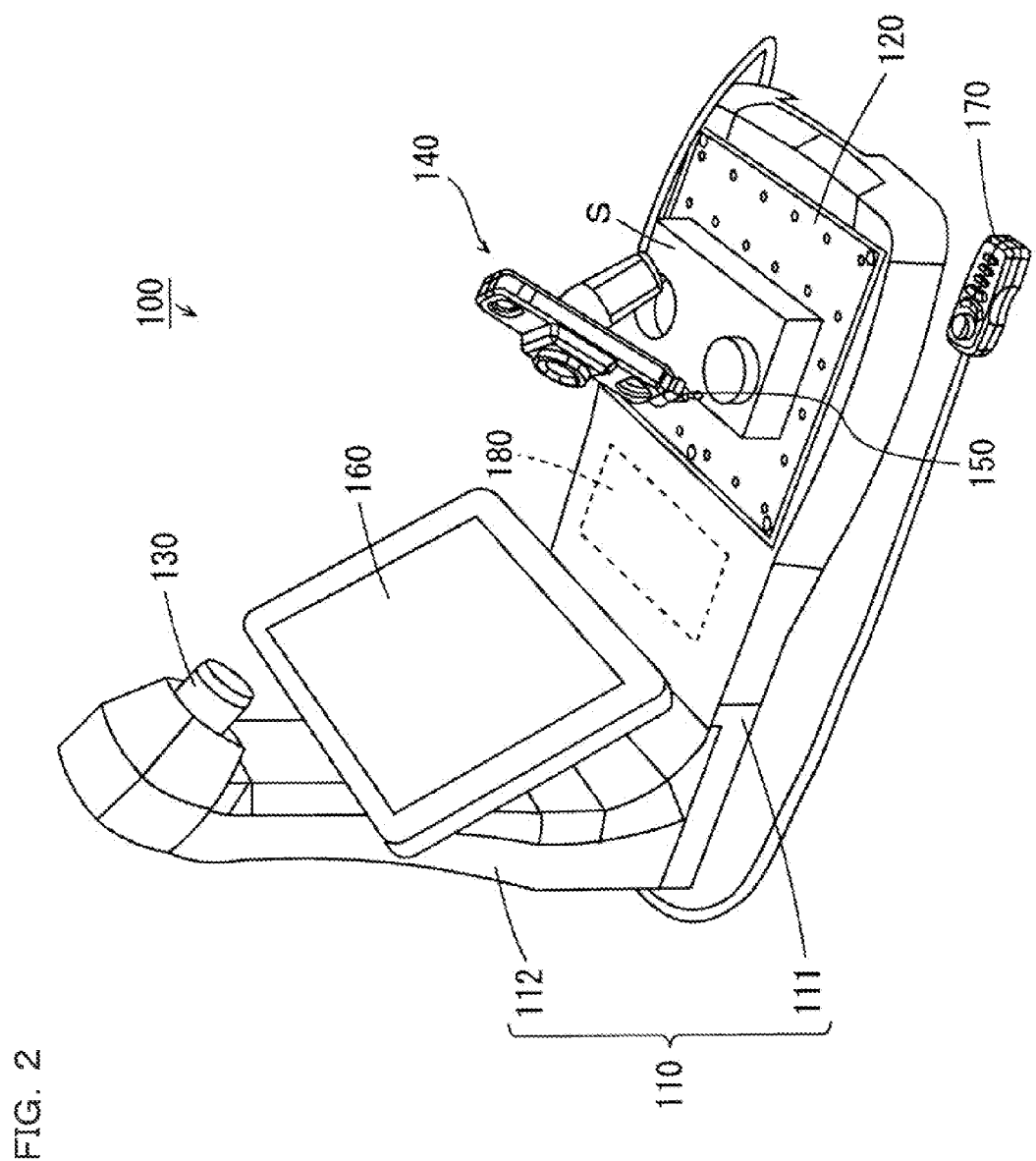
FIG. 2 is a perspective view showing a configuration of a measurement head of the optical coordinate measuring device of FIG. 1.

The main imaging unit 130 of FIG. 2 is located obliquely above the placement table 120. As described above, the user can easily turn the upper surface of the housing 141 obliquely upward. Therefore, the main imaging unit 130 can efficiently capture an image of infrared rays emitted from the plurality of light emitting units 143 of the probe 140 at the time of shape measurement of the measurement target S on the placement table 120.

As shown in FIG. 3, the stylus 144 is a stick member having a contact part 144a that can be brought into contact with the measurement target S. In the present embodiment, a spherical contact part 144a is provided at the tip of the stylus 144. An attachment part, not shown, for attaching the stylus 144 is formed on the front end surface and the lower surface of the housing 141. The user can arbitrarily change an attached position of the stylus 144 between the front end surface and the lower surface of the front end of the housing 141 in accordance with the shape of the measurement target S. In the example of FIG. 3, the stylus 144 is attached to the front end surface of the housing 141.

The power supply board 145 supplies electric power to the plurality of light emitting units 143. The power supply board 145 is housed inside the grip part 142. The connection terminal 146 is arranged on a lower part of the grip part 142. Operations of the plurality of light emitting units 143 are controlled by the control board 180 of FIG. 1 through a cable connected to the connection terminal 146. Note that the probe 140 and the control board 180 may be provided so as to be wirelessly communicable with each other.

The sub-imaging unit 150 is a CCD (charge coupled device) camera, for example. A resolution of the sub-imaging unit 150 may be lower than a resolution of the main imaging unit 130. The sub-imaging unit 150 is arranged in a position whose positional relationship with the contact part 144a of the stylus 144 of the probe 140 is known. In the present embodiment, the sub-imaging unit 150 is arranged on the end surface of the front end of the housing 141 of the probe 140. A light reception signal is outputted from each pixel of the sub-imaging unit 150 to the control board 180.

The notification unit 148 is arranged in the vicinity of the rear end of the upper surface of the housing 141. In the present embodiment, the notification unit 148 includes a plurality of green LEDs and a plurality of red LEDs. When the plurality of light emitting units 143 exist within the imaging region V (FIG. 2) of the main imaging unit 130 (FIG. 2), the notification unit 148 emits green light. On the other hand, when the plurality of light emitting units 143 do not exist within the imaging region V of the main imaging unit 130, the notification unit 148 emits red light. Accordingly, the user can easily recognize whether or not the plurality of light emitting units 143 exist within the imaging region V of the main imaging unit 130.

Further, a plurality of probes 140 can be used in the optical coordinate measuring device 300. In accordance with the shape of the measurement target S, the user can perform measurement of the measurement target S by selecting the probe 140 provided with the stylus 144 having a suitable shape in a suitable position. The probe 140 to be used is selected by use of the operation unit 170 based on an image displayed on the display unit 160. Further, a plurality of measurement positions of the measurement target S which are to be measured and the probes 140 to be used corresponding to the respective measurement positions out of the plurality of probes 140 may be previously associated with each other and registered in a control unit 220. Further, by proceeding measurement in accordance with a registered procedure with respect to the registered plurality of measurement positions to be measured, the probe 140 to be used may be automatically switched based on the registered association.

The notification unit 148 of the probe 140 to be used emits green light or red light. Specifically, when the plurality of light emitting units 143 of the probe 140 to be used exist within the imaging region V (FIG. 2) of the main imaging unit 130, the notification unit 148 of this probe 140 emits green light. On the other hand, when the plurality of light emitting units 143 of the probe 140 to be used do not exist within the imaging region V of the main imaging unit 130, the notification unit 148 of this probe 140 emits red light. The notification unit 148 of the other probe 140 does not emit light. Accordingly, the user can easily recognize the probe 140 to be used.

In the present embodiment, the plurality of light emitting units 143 of the probes 140, other than the probe 140 to be used, do not emit light. This prevents measurement by use of the probe 140 other than the probe 140 to be used.

As shown in FIG. 2, the display unit 160 is supported by the stand part 112 of the holding part 110, and is provided on the installation part 111 such that a display screen of the display unit 160 is turned obliquely upward. Accordingly, the user can selectively view the measurement target S and the display unit 160 by minimum movement of his or her eyes, or view the measurement target S and the display unit 160 at the same time.

The display unit 160 is configured by a liquid crystal display panel or an organic EL (electroluminescence) panel, for example. On the display unit 160, an image generated by the processing device 200, an operating procedure screen for the optical coordinate measuring device 300, a measurement result, and the like are displayed based on control by the control board 180.

The operation unit 170 has a plurality of operation buttons, for example. The operation unit 170 can be operated by the user at the time of designating a portion of the measurement target S to be measured, or at some other time. The operation unit 170 may be provided integrally with the probe 140. For example, in the grip part 142 of FIG. 3, one or a plurality of operation buttons may be provided as the operation unit 170. In this case, the user can operate the operation unit 170 while holding the grip part 142 with one hand.

The control board 180 is provided in the installation part 111 of the holding part 110. The control board 180 is connected to the main imaging unit 130, the probe 140, the sub-imaging unit 150, the display unit 160, and the operation unit 170. The processing device 200 controls operations of the main imaging unit 130, the probe 140, the sub-imaging unit 150, the display unit 160, and the operation unit 170 via the control board 180.

The control board 180 is mounted with an A/D convertor (analog/digital convertor) and a FIFO (first in, first out) memory, which are not shown. Light reception signals outputted from the main imaging unit 130 and the sub-imaging unit 150 are sampled by the A/D convertor of the control board 180 in a constant sampling period and also converted to digital signals. The digital signals outputted from the A/D convertor are sequentially stored into the FIFO memory. The digital signals stored into the FIFO memory are sequentially transmitted as pixel data to the processing device 200.

In the present embodiment, the timing for light emission by the plurality of light emitting units 143 of FIG. 3 is synchronized with the timing for imaging by the main imaging unit 130 of FIG. 2. Pixel data stored in a light emission period of the plurality of light emitting units 143 is transmitted from the control board 180 to the processing device 200 in a next quenching period of the light emitting units 143.

As shown in FIG. 1, the processing device 200 includes a storage unit 210, the control unit 220, and an operation unit 230. The storage unit 210 includes a ROM (read only memory), a RAM (random access memory), and a hard disk. A system program is stored into the storage unit 210. Further, the storage unit 210 is used for processing a variety of data and storing a variety of data such as pixel data from the measurement head 100.

The control unit 220 includes a CPU (central processing unit). In the present embodiment, the storage unit 210 and the control unit 220 are realized by a personal computer. The control unit 220 generates image data based on the pixel data from the measurement head 100. The image data is an aggregate of plurality of pieces of pixel data. The control unit 220 calculates a position of the contact part 144a of the stylus 144 of the probe 140 based on the generated image data.

The operation unit 230 includes a key board and a pointing device. The pointing device includes a mouse, a joy stick, or the like. The operation unit 230 is operated by the user.

(2) Configuration of Main Imaging Unit

Figure 4B:
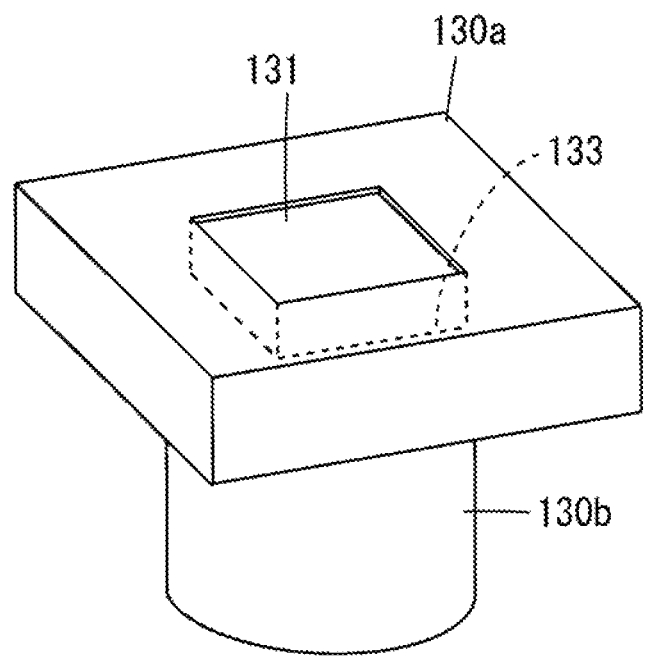
Figure 5:
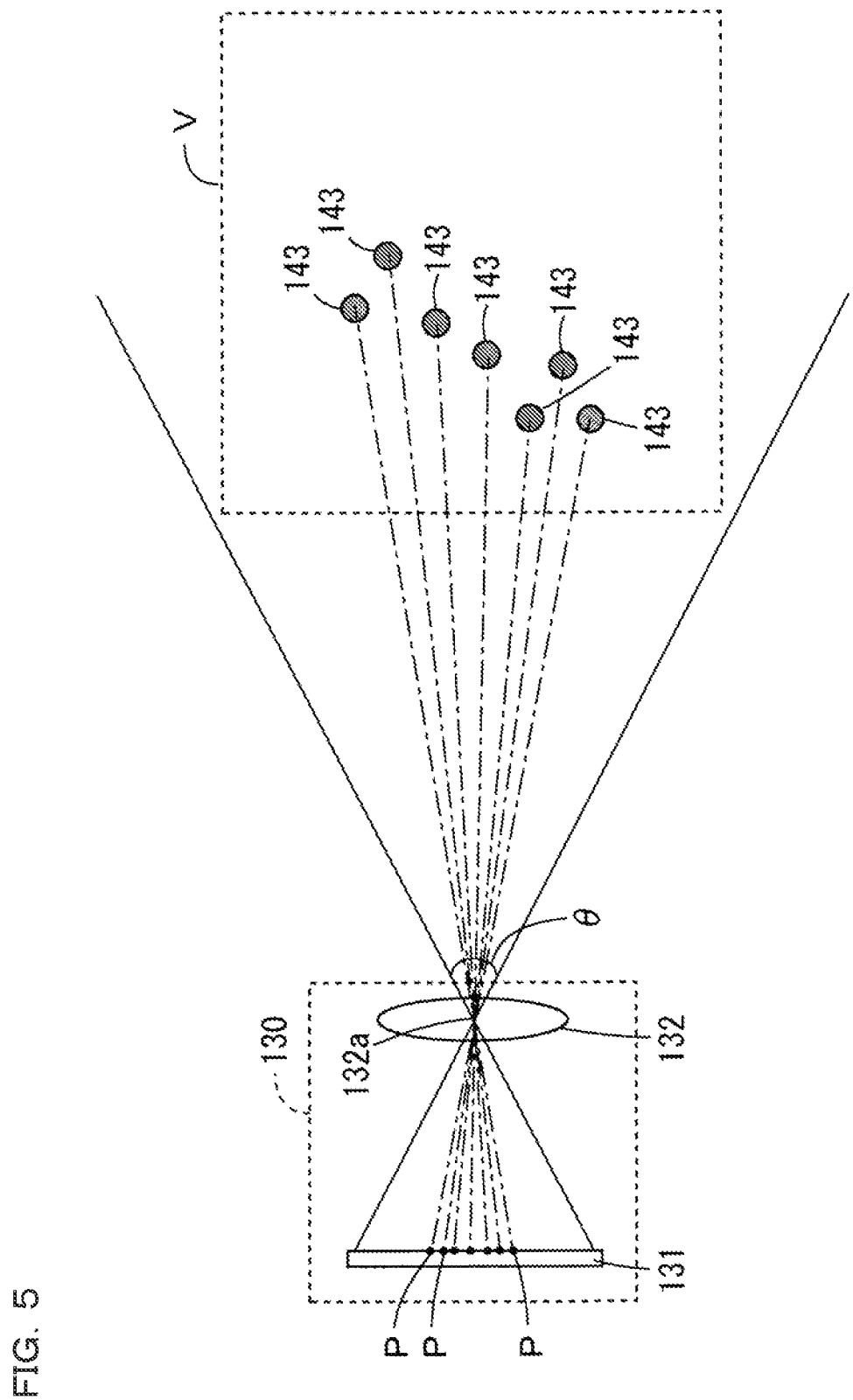
FIG. 5 is a schematic view for describing the relationship between the main imaging unit and a plurality of light emitting units.

FIGS. 4A and 4B are views for describing a configuration of the main imaging unit 130. FIG. 4A is a schematic sectional view of the main imaging unit 130, and FIG. 4B is an external perspective view of the main imaging unit 130.

As shown in FIG. 4A, the main imaging unit 130 is provided with an element holding part 130a, a lens holding part 130b, an imaging element 131, and a plurality of lenses 132. The element holding part 130a and the lens holding part 130b are made of a metal material, for example. The element holding part 130a and the lens holding part 130b may be provided as a common member by integral molding, or may be provided as separate bodies.

A recess 133 having a rectangular cross section is formed on one surface of the element holding part 130a. The imaging element 131 is fitted to the recess 133. In order to prevent positional displacement of the imaging element 131, the imaging element 131 may be fixed in the recess 133. A through hole 134 is formed from the bottom surface of the recess 133 to the other surface of the element holding part 130a which is parallel to the above one surface.

The lens holding part 130b has a cylindrical shape. One end of the lens holding part 130b is fixed to the other surface of the element holding part 130a. The plurality of lenses 132 having various sizes are held in the lens holding part 130b. The plurality of lenses 132 overlap with the through hole 134 of the element holding part 130a, and arranged such that optical axes thereof agree with each other. Light is incident on the imaging element 131 from the other end of the lens holding part 130b through the plurality of lenses 132.

(3) Detection by Main Imaging Unit

As described above, the main imaging unit 130 detects infrared rays emitted from the plurality of light emitting units 143 of the probe 140. FIG. 5 is a schematic view for describing the relationships between the main imaging unit 130 and a plurality of light emitting units 143. In FIG. 5, a description will be given using a so-called pin hole camera model in order to facilitate understanding. FIG. 5 shows only one lens 132 out of the plurality of lenses 132 of the main imaging unit 130, and light is guided to the imaging element 131 so as to pass through a main point 132a of the lens 132.

As shown in FIG. 5, the main imaging unit 130 has a constant angle of view (viewing angle) θ. The imaging region V is included within the range of the angle of view θ of the main imaging unit 130. When each of the plurality of light emitting units 143 are located within the imaging region V, infrared rays emitted from those light emitting units 143 are incident on the imaging element 131 through the main point 132a of the lens 132.

In this case, a direction from the main point 132a of the lens 132 to each light emitting unit 143 is specified based on a light reception position P of the imaging element 131. In the example of FIG. 5, as indicated by a dashed line, each light emitting unit 143 is located on each straight line passing through each light reception position P and the main point 132a of the lens 132. Further, the relative positional relationship among the plurality of light emitting units 143 is previously stored into the storage unit 210 of FIG. 1, for example.

Based on the direction from the main point 132a of the lens 132 toward each light emitting unit 143 and the positional relationship among the plurality of light emitting units 143, a position of the center of each light emitting unit 143 is unambiguously decided. Further, in the present embodiment, an x-axis, a'y-axis, and a z-axis which are orthogonal to each other are defined, and an absolute position within the imaging region V is represented by three-dimensional coordinates. The control unit 220 of FIG. 1 calculates coordinates of the center of each light emitting unit 143 based on the light reception position P of the imaging element 131 and the previously stored positional relationship among the plurality of light emitting units 143.

Based on the calculated coordinates of the center of each light emitting unit 143, coordinates of the contact position between the contact part 144a (FIG. 3) of the probe 140 and the measurement target S are calculated by the control unit 220 of FIG. 1.

For example, the positional relationship between the center of each light emitting unit 143 and the center of the contact part 144a (FIG. 3) is previously stored into the storage unit 210 of FIG. 1. Based on the calculated coordinates of the center of each light emitting unit 143 and the previously stored positional relationship between the center of each light emitting unit 143 and the center of the contact part 144a, coordinates of the center of the contact part 144a are specified.

Further, based on the coordinates of the center of each light emitting unit 143, an attitude of the probe 140 is specified. An orientation of the stylus 144 is thereby specified. Further, based on a change in coordinates of the center of each light emitting unit 143, a moving direction of the contact part 144a is specified. Normally, the contact part 144a is vertically brought close to the plane of the measurement target S with which it is to be brought into contact. Therefore, based on the specified orientation of the stylus 144 and the specified moving direction of the contact part 144a, the relative positional relationship between the center of the contact part 144a and the contact position is estimated. Based on the estimated positional relationship, coordinates of the contact position between the contact part 144a and the measurement target S are calculated from the coordinates of the center of the contact part 144a.

Note that a sensor for detecting a direction of force that is applied from the measurement target S to the contact part 144a may be provided in the probe 140. In this case, it is possible to calculate coordinates of the contact position between the contact part 144a and the measurement target S based on a result of detection by the sensor.

The calculated coordinates vary when there is an individual difference in the positional relationships between the imaging element 131 and the plurality of lenses 132, the positional relationship among the plurality of light emitting units 143, the positional relationships between the plurality of light emitting units 143 and the contact part 144a, or the like. Accordingly, it is preferable to perform calibration for preventing variation due to the individual difference before performing measurement by the optical coordinate measuring device 300. The calibration result may be held as specific data and the specific data may be referred to at the time of measurement of the measurement target, or based on the calibration result, the above individual difference in each positional relationship or the like may be adjusted before actual measurement is performed.

(4) Measurement Examples

Figure 6:
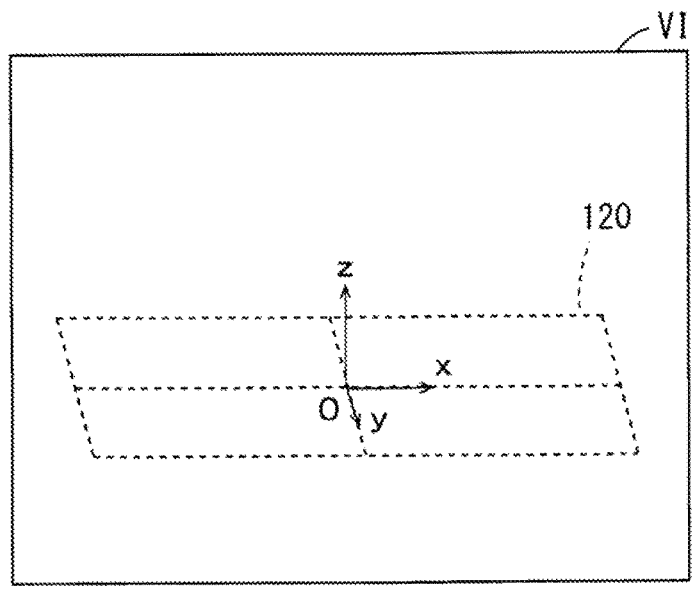
FIG. 6 is a view showing one example of an image displayed on a display unit of FIG. 2.
Figure 7:
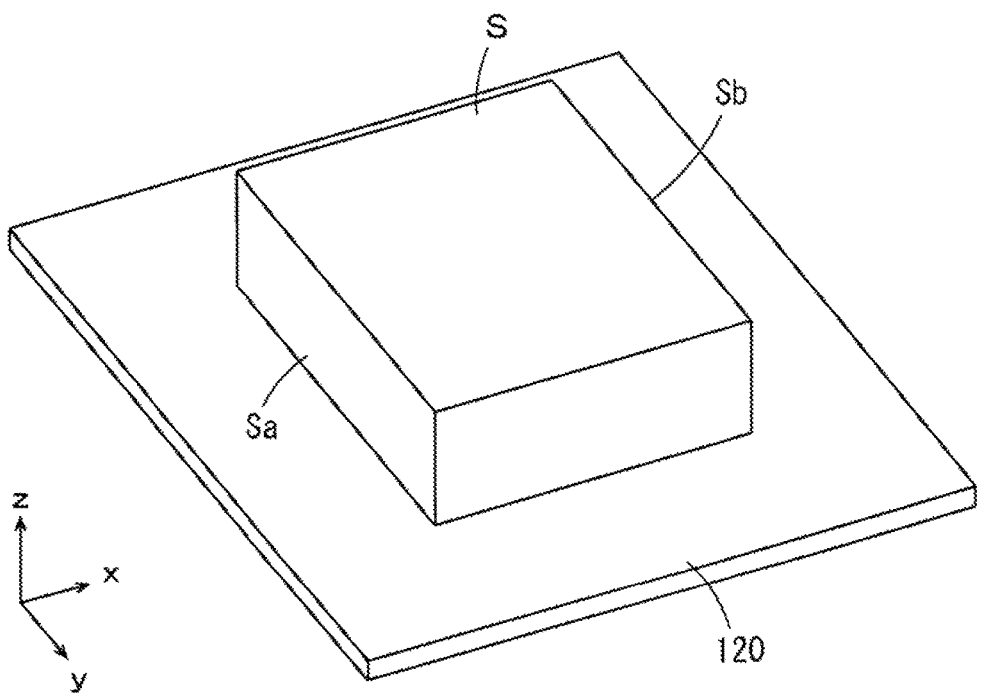
FIG. 7 is a view showing one example of a measurement target.

There will be described examples of measuring a size of the measurement target S by the optical coordinate measuring device 300. FIG. 6 is a view showing one example of an image displayed on the display unit 160 of FIG. 2. FIG. 7 is a view showing one example of the measurement target S.

FIG. 6 shows an image (hereinafter referred to as imaging-region virtual image) VI that virtually represents the imaging region V. As described above, the x-axis, the y-axis, and the z-axis are each set in the imaging region V. In this example, the x-axis and the y-axis are set so as to be parallel to the upper surface of the placement table 120 and orthogonal to each other, and the z-axis is set vertically to the upper surface of the placement table 120. Further, the center of the placement table 120 is set at an origin O. The imaging-region virtual image VI of FIG. 6 includes lines (dotted lines of FIG. 6) representing an outer periphery of the placement table 120, while including the origin O, the x-axis, the y-axis, and the z-axis.

The measurement target S of FIG. 7 has a rectangular parallelepiped shape. In this example, a distance between one side surface Sa of the measurement target S and a side surface Sb opposite to the side surface Sa is measured. The side surfaces Sa, Sb of the measurement target S are each vertical to the x-axis.

Figure 8A:
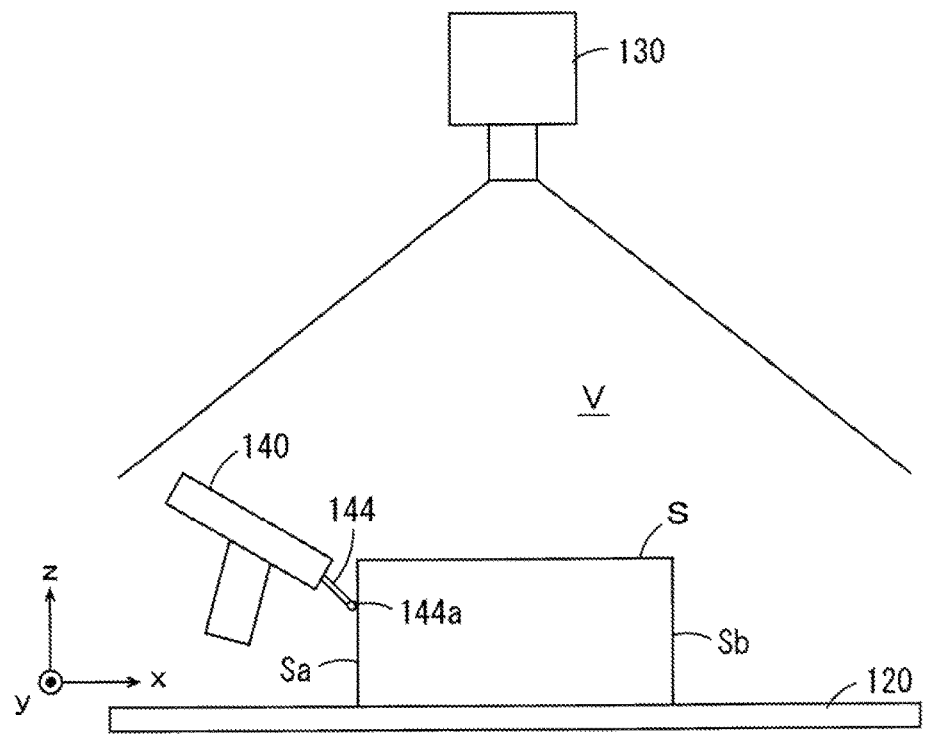
FIGS. 8A and 8B are views for describing a measurement example.
Figure 8B:
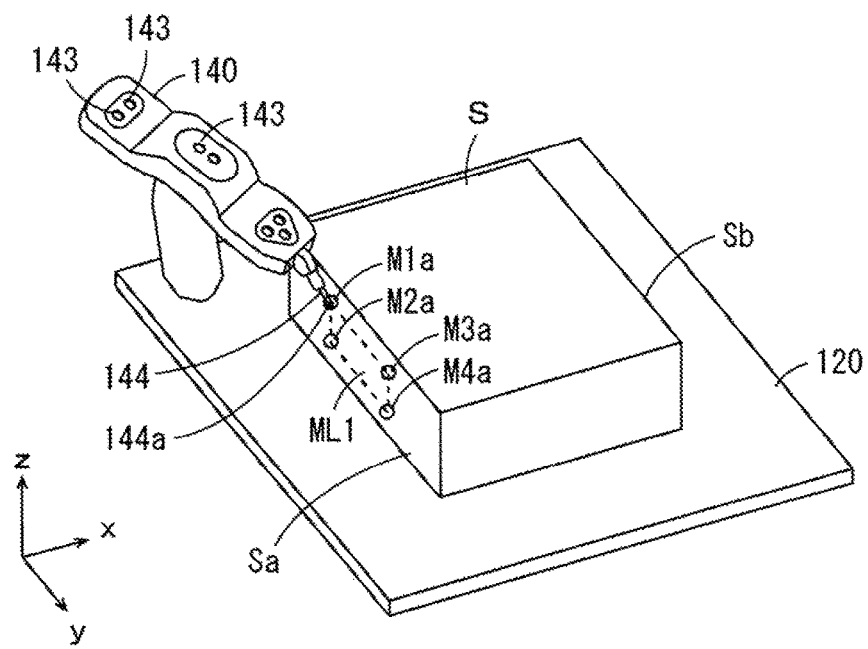
Figure 9:
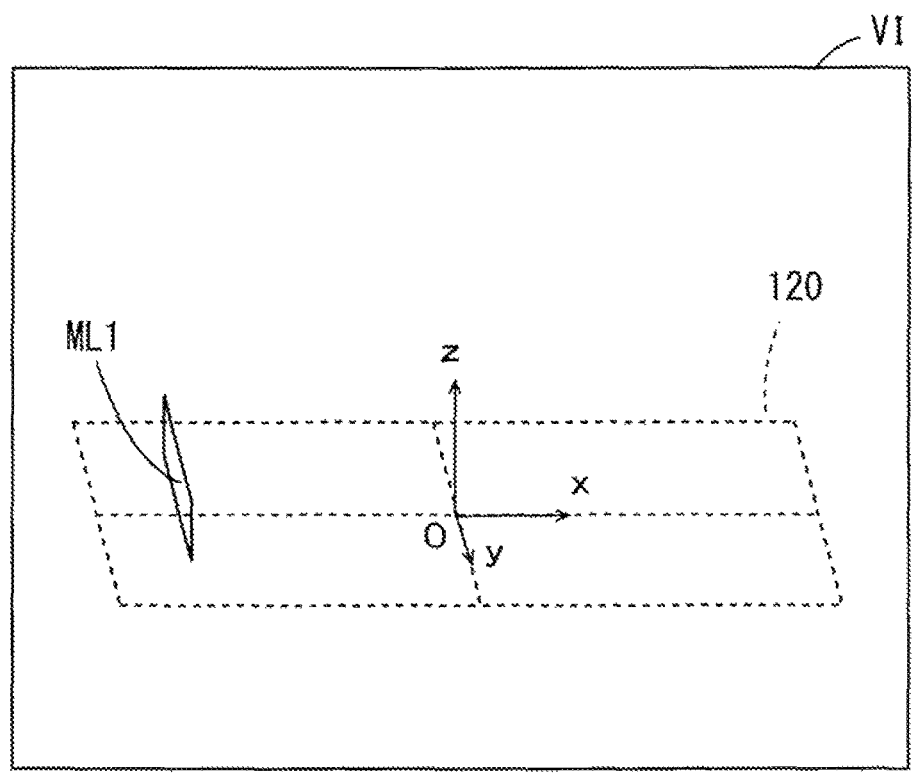
FIG. 9 is a view for describing the measurement example.
Figure 10A:
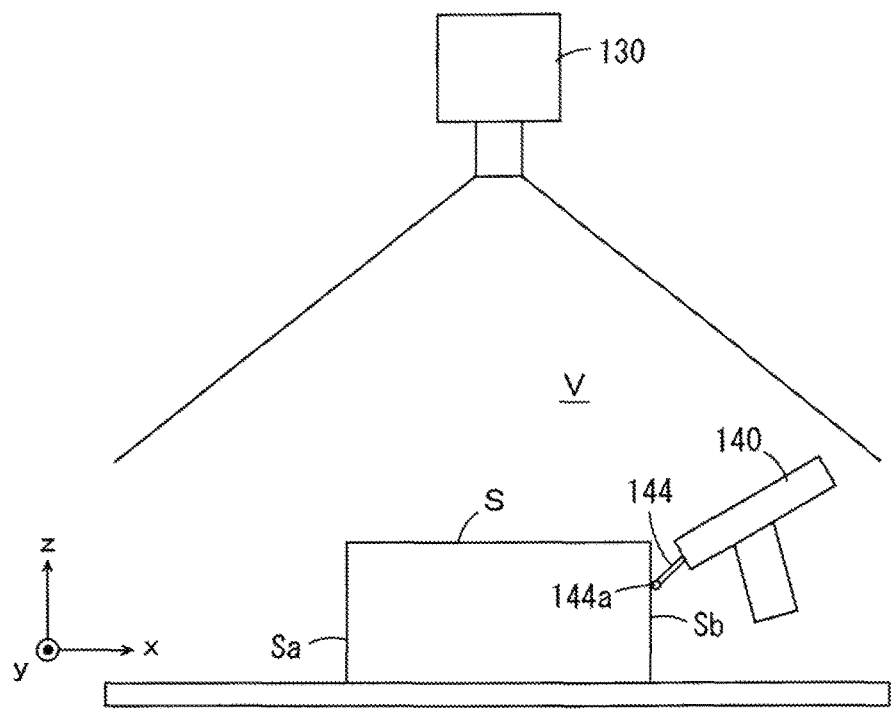
FIGS. 10A and 10B are views for describing a measurement example.
Figure 10B:
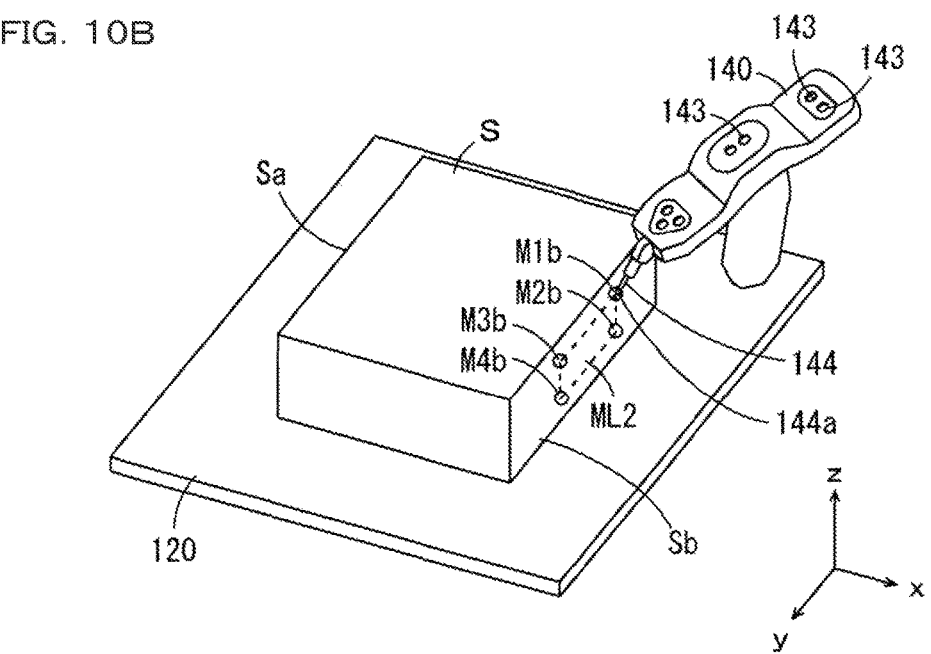
Figure 11:
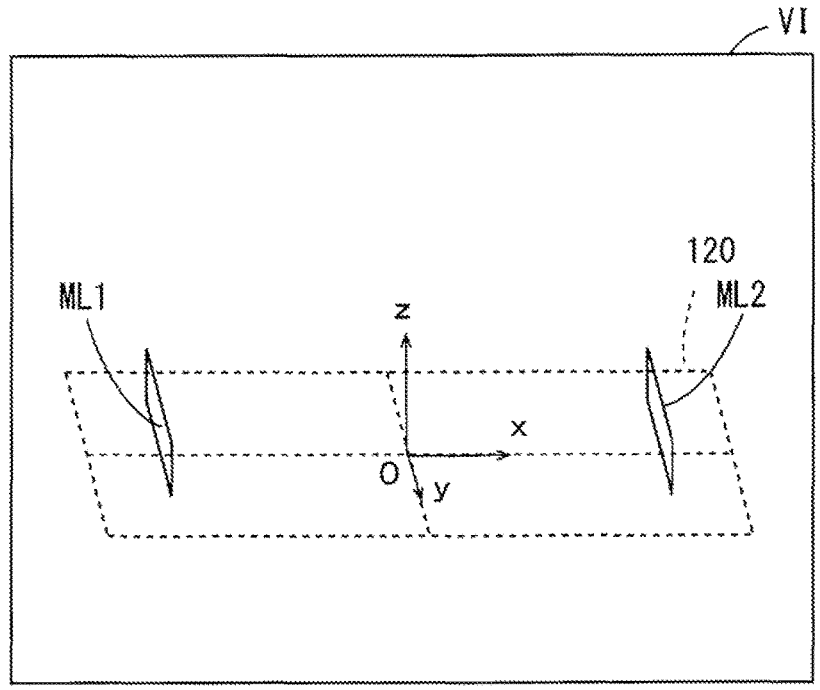
FIG. 11 is a view for describing the measurement example.
Figure 12:
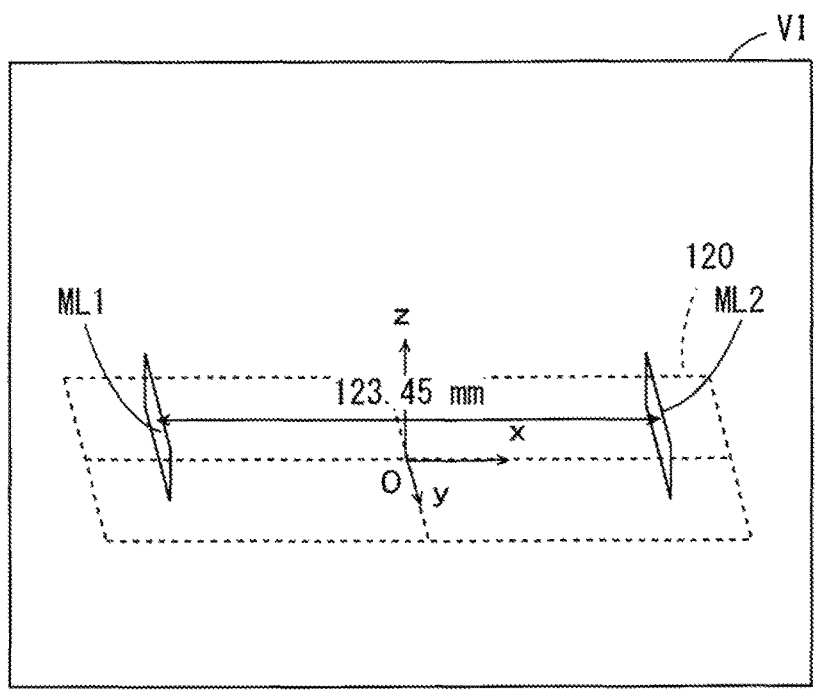
FIG. 12 is a view for describing the measurement example.

FIGS. 8 to 12 are views for describing specific measurement examples in the measurement target S of FIG. 7. FIGS. 8A and 10A are front views showing the positional relationship among the placement table 120, the main imaging unit 130, the probe 140, and the measurement target S, and FIGS. 8B and 10B are external perspective views of the probe 140 and the measurement target S. FIGS. 9, 11, and 12 show examples of the imaging-region virtual image VI displayed on the display unit 160.

As shown in FIGS. 8A and 8B, the contact part 144a of the stylus 144 is brought into contact with the side surface Sa of the measurement target S such that the plurality of light emitting units 143 of the probe 140 are located within the imaging region V. By the operation unit 170 of FIG. 1 being operated under this state, the contact position between the measurement target S and the contact part 144a is set as a measurement position M1a, as shown in FIG. 8B. In this case, coordinates of the measurement position M1a are specified.

Similarly, three positions on the side surface Sa of the measurement target S are set as measurement positions M2a, M3a, M4a, and coordinates of the measurement positions M2a, M3a, M4a are specified. Subsequently, by the operation unit 170 or the operation unit 230 of FIG. 1 being operated, a plane passing through the measurement positions M1a to M4a is set as a measurement plane ML1 corresponding to the side surface Sa of the measurement target S. In this case, as shown in FIG. 9, the set measurement plane ML1 is superimposed on the imaging-region virtual image VI.

Subsequently, as shown in FIGS. 10A and 10B, the contact part 144a of the stylus 144 is brought into contact with the side surface Sb of the measurement target S such that the plurality of light emitting units 143 of the probe 140 are located within the imaging region V. By the operation unit 170 of FIG. 1 being operated under this state, the contact position between the measurement target S and the contact part 144a is set as a measurement position M1b, as shown in FIG. 10B. In this case, coordinates of the measurement position M1b are specified.

Similarly, three positions on the side surface Sb of the measurement target S are set as measurement positions M2b, M3b, M4b, and coordinates of the measurement positions M2b, M3b, M4b are specified. Subsequently, by the operation unit 170 or the operation unit 230 of FIG. 1 being operated, a plane passing through the measurement positions M1b to M4b is set as a measurement plane ML2 corresponding to the side surface Sb of the measurement target S. In this case, as shown in FIG. 11, the set measurement plane ML2 is superimposed on the imaging-region virtual image VI in addition to the measurement plane ML1.

Subsequently, by the operation unit 170 or the operation unit 230 of FIG. 1 being operated, a distance between the decided measurement planes ML1 and ML2 is calculated in the control unit 220 of FIG. 1, and as shown in FIG. 12, the calculation result is displayed on the imaging-region virtual image VI. Note that the calculation result may be displayed on the display unit 160 separately from the imaging-region virtual image VI. Further, a condition for calculation of the distance between the two measurement planes and the like may be appropriately set by the user.

Although one measurement plane is decided based on the four measurement positions in this example, one measurement plane can be set based on three measurement positions at the minimum. Meanwhile, by setting four or more measurement positions, it is possible to more accurately set the measurement plane corresponding to the measurement target S. Further, based on four or more measurement positions, it is also possible to obtain the flatness of the plane of the measurement target S.

Moreover, although the plane (measurement plane) passing through the designated plurality of positions (measurement positions) is set as the target for measurement in this example, another geometrical shape may be set as the target for measurement in accordance with the shape of the measurement target. For example, a cylinder, a sphere, or the like passing through the designated plurality of positions may be set as the target for measurement. In this case, a diameter of a cross section of the set cylinder, a radius of the set sphere, or the like can be obtained. Further, an angle, an area, or the like with respect to the set geometrical shape may be obtained.

When the optical coordinate measuring device 300 according to the present embodiment is used for pass/fail inspection of a manufactured component, a geometric characteristic to be measured is previously set in the optical coordinate measuring device 300 before measurement of the measurement target (manufactured component) is actually performed. The measurement of the measurement target is performed with respect to the geometric characteristic, and whether or not the measurement target has the shape as designed is inspected based on the measurement result. In this case, pass/fail criteria may be previously set in the optical coordinate measuring device 300 with respect to a plurality of respective geometric characteristics to be measured, and the optical coordinate measuring device 300 may compare measurement results of the measurement target with respect to the plurality of geometric characteristics and the previously set pass/fail criteria with respect to the plurality of geometric characteristics, to perform pass/fail decision with respect to the respective geometric characteristics. Further, measurement procedures for the plurality of geometric characteristics and the pass/fail criteria with respect to the plurality of geometric characteristics may be previously set in the optical coordinate measuring device 300, and in addition to performing the pass/fail decision with respect to the respective geometric characteristics, the optical coordinate measuring device 300 may perform synthetic pass/fail decision on the measurement target based on comparison results between the measurement results and the pass/fail criteria with respect to the plurality of geometric characteristics.

(5) Example of Use of Imaging Unit

By capturing an image of the measurement target S by the sub-imaging unit 150 of FIG. 3, the image of the measurement target S can be displayed on the display unit 160. Hereinafter, the image obtained by the sub-imaging unit 150 is referred to as a captured image.

The positional relationships between the plurality of light emitting units 143 and the sub-imaging unit 150 and features (angle of view, distortion, etc.) of the sub-imaging unit 150 are previously stored as imaging information into the storage unit 210 of FIG. 1, for example. Accordingly, when the plurality of light emitting units 143 are within the imaging region V, an image of a region captured by the sub-imaging unit 150 is recognized by the control unit 220 of FIG. 1. That is, a three-dimensional space corresponding to the captured image is recognized by the control unit 220.

As described above, information concerning the measurement (hereinafter referred to as measurement information) such as the measurement position and the measurement plane is set in the three-dimensional space. In the present embodiment, the measurement information can be associated with the captured image, and the measurement information can be superimposed and displayed on the captured image.

Figure 13:
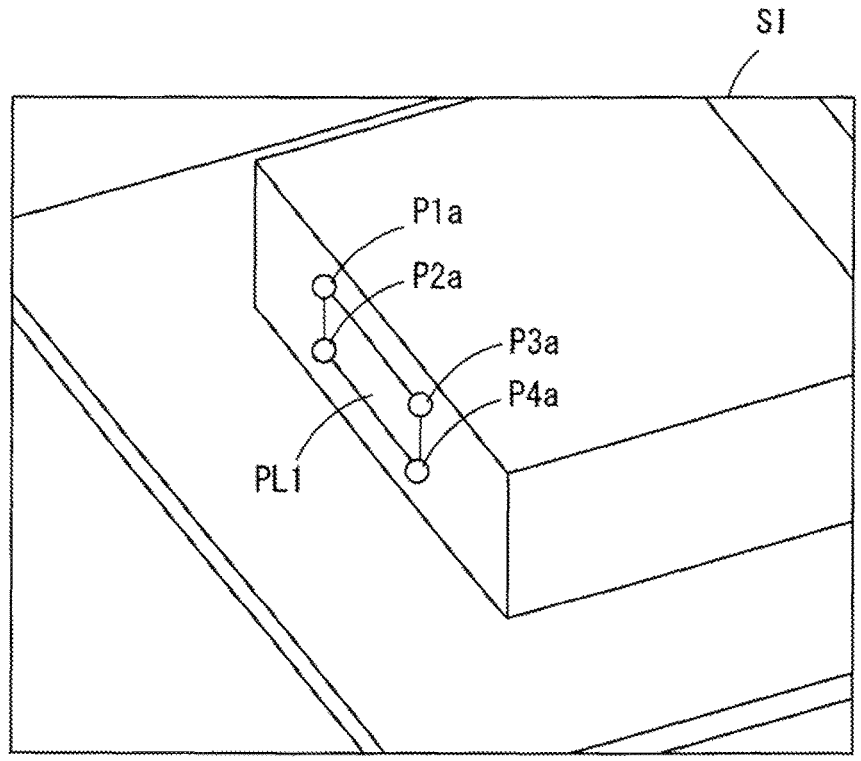
FIG. 13 is a view showing an example in which measurement information is superimposed and displayed on a captured image.

FIG. 13 is a view showing an example in which measurement information is superimposed and displayed on a captured image. In the example of FIG. 13, an image of the side surface Sa of the measurement target S is captured by the sub-imaging unit 150. On this captured image SI, an image PL1 representing the measurement plane ML1 is superimposed and a plurality of spherical images P1a to P4a representing the measurement positions M1a to M4a are also superimposed.

Thus, by superimposing the measurement information on the captured image obtained by actually capturing the image of the measurement target S, the user can easily visually grasp the measurement information. Further, in the case of performing measurement on one measurement target S and thereafter performing similar measurement on another measurement target S, the measurement on another measurement target S can be easily performed by referring to the captured image superimposed with the measurement information.

(6) Effect

In the optical coordinate measuring device 300 according to the above embodiment, the main imaging unit 130 and the placement table 120 are integrally held by the holding part 110 such that an image of the imaging region V above the placement table 120 is captured by the main imaging unit 130. This facilitates handling of the optical coordinate measuring device 300 as compared to a case where the main imaging unit 130 and the placement table 120 are provided as separate bodies. Further, a fixing tool for fixing the main imaging unit 130 is not required be separately prepared. This leads to improvement in efficiency of measurement performed by the optical coordinate measuring device 300.

Further, in the above embodiment, since the main imaging unit 130 is arranged obliquely above the placement table 120, it is possible to capture an image of a wide range of region above the placement table 120 while suppressing an increase in size of the optical coordinate measuring device 300. Moreover, the main imaging unit 130 is prevented from obstructing movement of the probe 140.

Furthermore, in the above embodiment, the display unit 160 is provided integrally with the main imaging unit 130 and the placement table 120 so as to be held in the holding part 110. Accordingly, the user can easily check a result of calculation by the control unit 220 and the like, without separately preparing a display unit.

(7) Another Example of Placement Table

Figure 14:
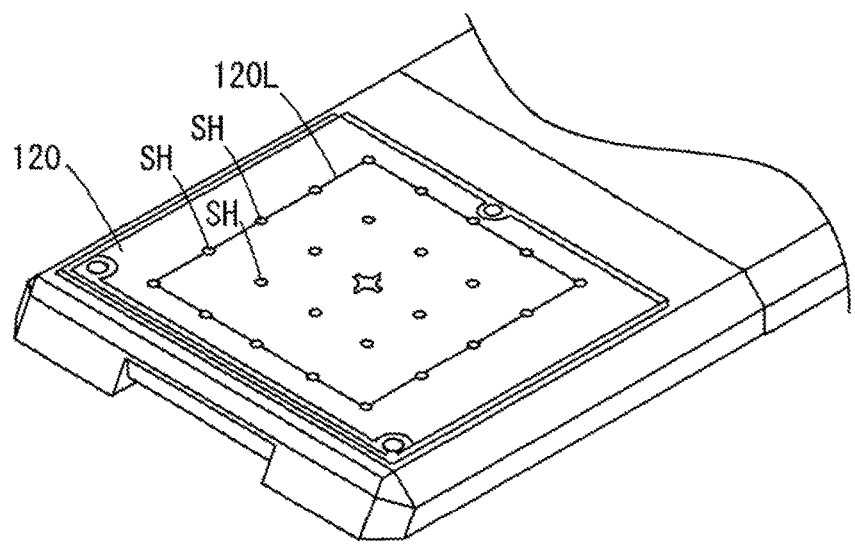
FIG. 14 is an external perspective view showing another example of the placement table.

FIG. 14 is an external perspective view showing another example of the placement table 120. In the placement table 120 of FIG. 14, points different from the placement table 120 of FIG. 2 will be described. Region display lines 120L in a rectangular shape are provided to the placement table 120 of FIG. 14. The region display lines 120L represent a region (hereinafter referred to as accuracy ensuring region) where the measurement accuracy is ensured. In this example, the accuracy ensuring region is a rectangular parallelepiped region having a width of 200 mm, a depth of 200 mm, and a height of 150 mm above the central part of the placement table 120.

Since the accuracy ensuring region is a region where the accuracy is ensured, even when the measurement position of the measurement target S is within the accuracy ensuring region, it is not necessarily that the plurality of light emitting units 143 do not get out of the imaging region V in a state where the contact part 144a of the probe 140 is in contact with the measurement position, but the plurality of light emitting units 143 may get out of the imaging region V depending on the position or the attitude of the probe 140.

When the measurement position of the measurement target S is within the accuracy ensuring region, the plurality of light emitting units 143 relatively hardly get out of the imaging region in the state where the contact part 144a of the probe is in contact with the measurement position. Thus, the positions of the plurality of light emitting units 143 can be accurately obtained based on image data acquired by the main imaging unit 130. Hence, coordinates of the measurement position are relatively accurately calculated. On the other hand, when the measurement position of the measurement target S is outside the accuracy ensuring region, at least part of the light emitting units 143 easily get out of the imaging region V in the state where the contact part 144a of the probe 140 is in contact with the measurement position. Further, even when the plurality of light emitting units 143 are within the imaging region V, there are cases where the positions of the light emitting units 143 are not accurately obtained. Hence, there are cases where the coordinates of the measurement position are not accurately calculated. As the distance between the measurement position and the accuracy ensuring region is larger, an error occurs more easily in the calculation result of the coordinates of the measurement position.

The user places the measurement target S on the placement table 120 with the region display lines 120L used as a guide such that the measurement position is located within the accuracy ensuring region. This prevents deterioration in measurement accuracy of the measurement target S. The region display lines 120L may be drawn in ink or the like on the placement table 120, or may be formed as grooves or slits on the placement table 120.

A plurality of screw holes SH are provided in the placement table 120. To these screw holes SH, fixing members (e.g., cramp members or fixing screws) for fixing the measurement target S are attached. In the example of FIG. 14, the plurality of screw holes SH are formed so as to be regularly arranged on and inside the region display lines 120L, and the screw hole SH is not formed outside the region display lines 120L. Hence, it is possible to recognize the accuracy ensuring region based on positions the plurality of screw holes SH. Therefore, when the plurality of screw holes SH are formed as in this example, the region display lines 120L may not be provided to the placement table 120.

Figure 15:
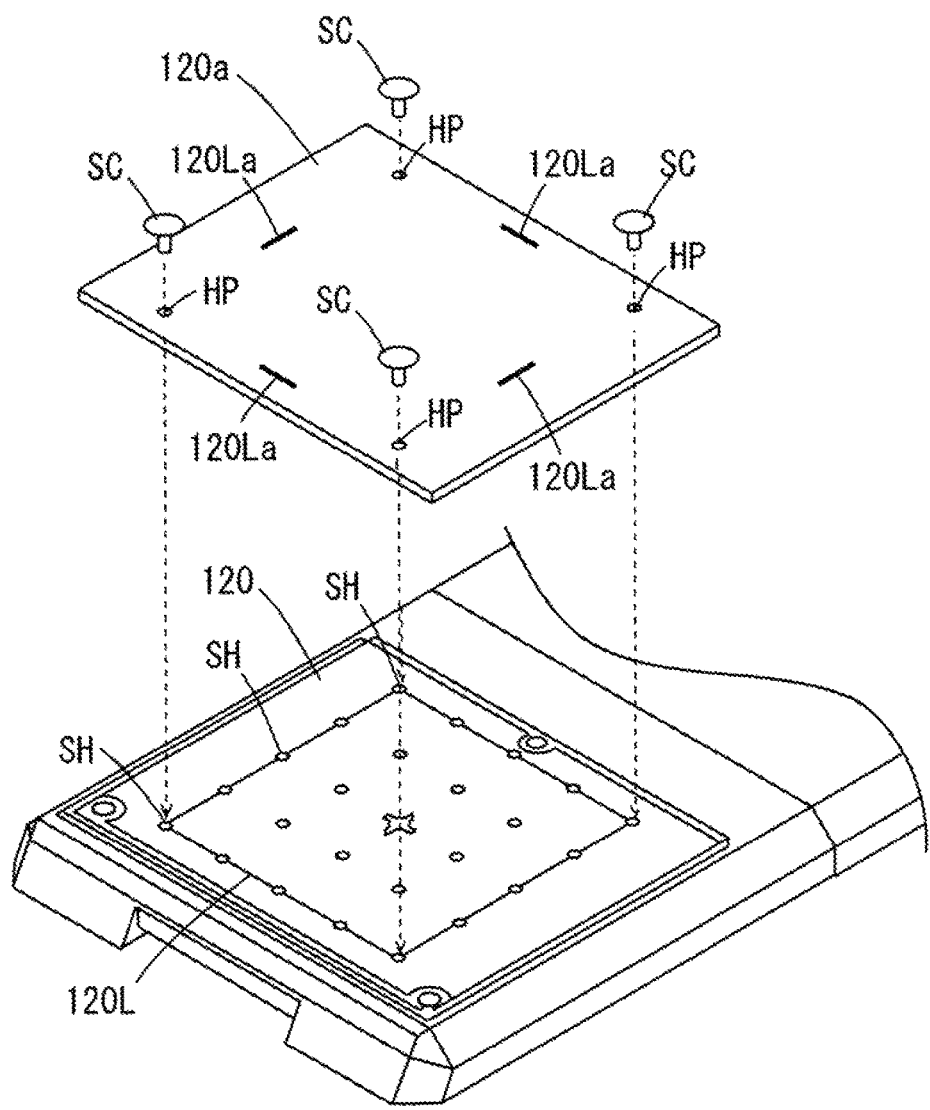
FIG. 15 is a view showing an example in which a plate member is attached onto the placement table.

A plate member having a specific property may be attached onto the placement table 120. FIG. 15 is a view showing an example in which the plate member is attached onto the placement table 120. In the example of FIG. 15, a plate member 120a is attached onto the placement table 120 by screwing the plurality of screws SC into the screw holes SH through hole parts HP of the plate member 120a. The plate member 120a is provided with region display lines 120La representing the accuracy ensuring region.

In the example of FIG. 15, four hole parts HP of the plate member 120a overlap with the screw holes SH provided at four apexes of the region display line 120L on the placement table 120. Therefore, positions of the four screws SC that are inserted into the four hole parts HP represent positions of the four apexes of the region display line 120L. Hence, it is possible to recognize the accuracy ensuring region based on the positions of the four screws SC. Accordingly, when the hole parts HP are provided as in this example, the region display lines 120La may not be provided to the plate member 120a.

The plate member 120a may have adhesiveness on its upper surface, or may have magnetism. The use of such a plate member 120a can facilitate fixing of the measurement target S onto the placement table 120. The attaching method for the plate member 120a is not limited to the example of FIG. 15. For example, the lower surface of the plate member 120a may have adhesiveness, or the plate member 120a may be attached onto the placement table 120 by use of another member.

(8) Other Embodiments (8-1)

In the above embodiment, above the one end of the holding part 110 of the measurement head 100, the main imaging unit 130 is provided via the stand part 112, the placement table 120 is provided at the other end of the holding part 110, and the display unit 160 is provided between the stand part 112 and the placement table 120. However, the arrangement of the placement table 120, the main imaging unit 130 and the display unit 160 is not limited thereto.

Figure 16:
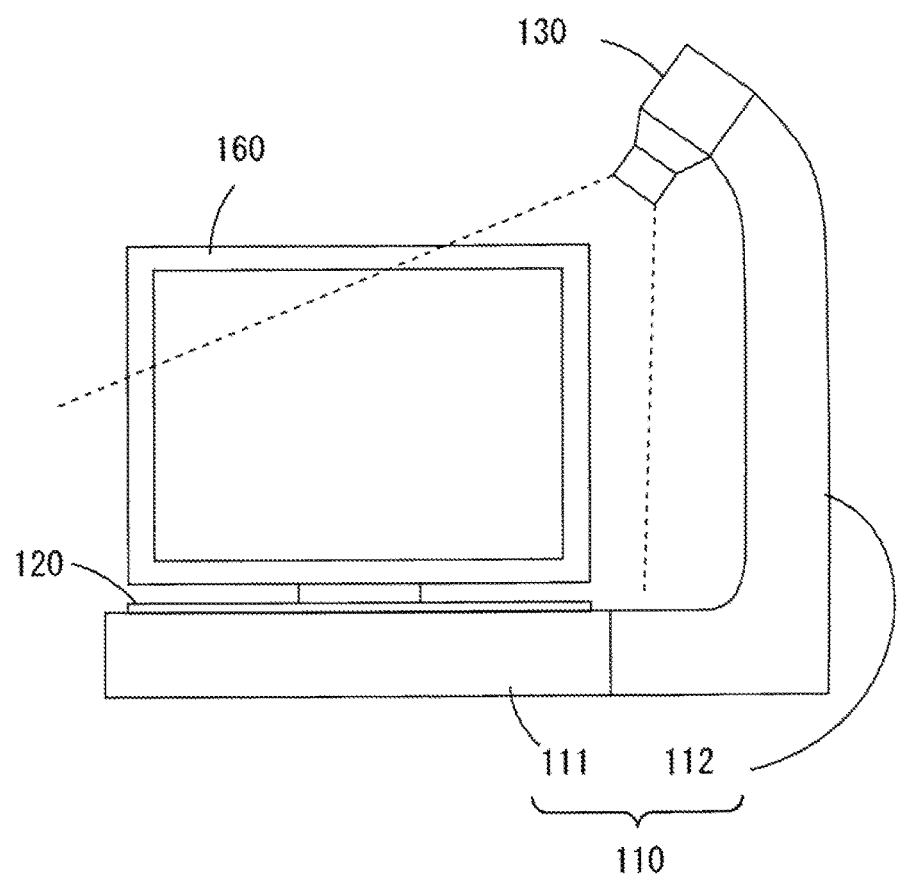
FIG. 16 is a front view showing another arrangement example of the placement table, the main imaging unit, and the display unit.
Figure 17:
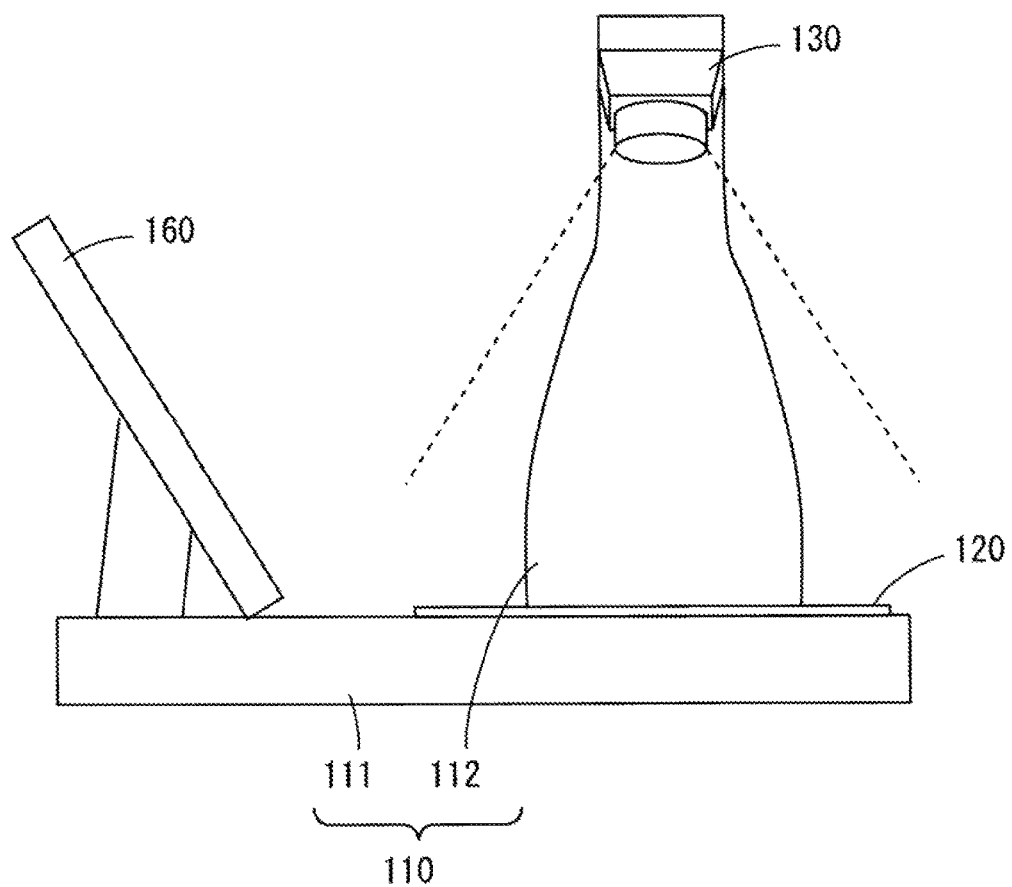
FIG. 17 is a side view showing another arrangement example of the placement table, the main imaging unit, and the display unit.

FIGS. 16 and 17 are a front view and a side view showing another arrangement example of the placement table 120, the main imaging unit 130, and the display unit 160. In the example of FIGS. 16 and 17, points different from the example of FIG. 2 will be described.

In the example of FIGS. 16 and 17, instead of providing the main imaging unit 130 at the one end of the holding part 110 via the stand part 112, the stand part 112 is provided on the side of the placement table 120, and the main imaging unit 130 is provided at the upper end of the stand part 112. In a plan view, a direction from the placement table 120 toward the display unit 160 and a direction from the placement table 120 toward the main imaging unit 130 are orthogonal to each other.

Also in this example, the main imaging unit 130 is located obliquely above the placement table 120. Hence, it is possible to capture an image of the imaging region V above the placement table 120 while suppressing an increase in size of the measurement head 100.

Figure 18:
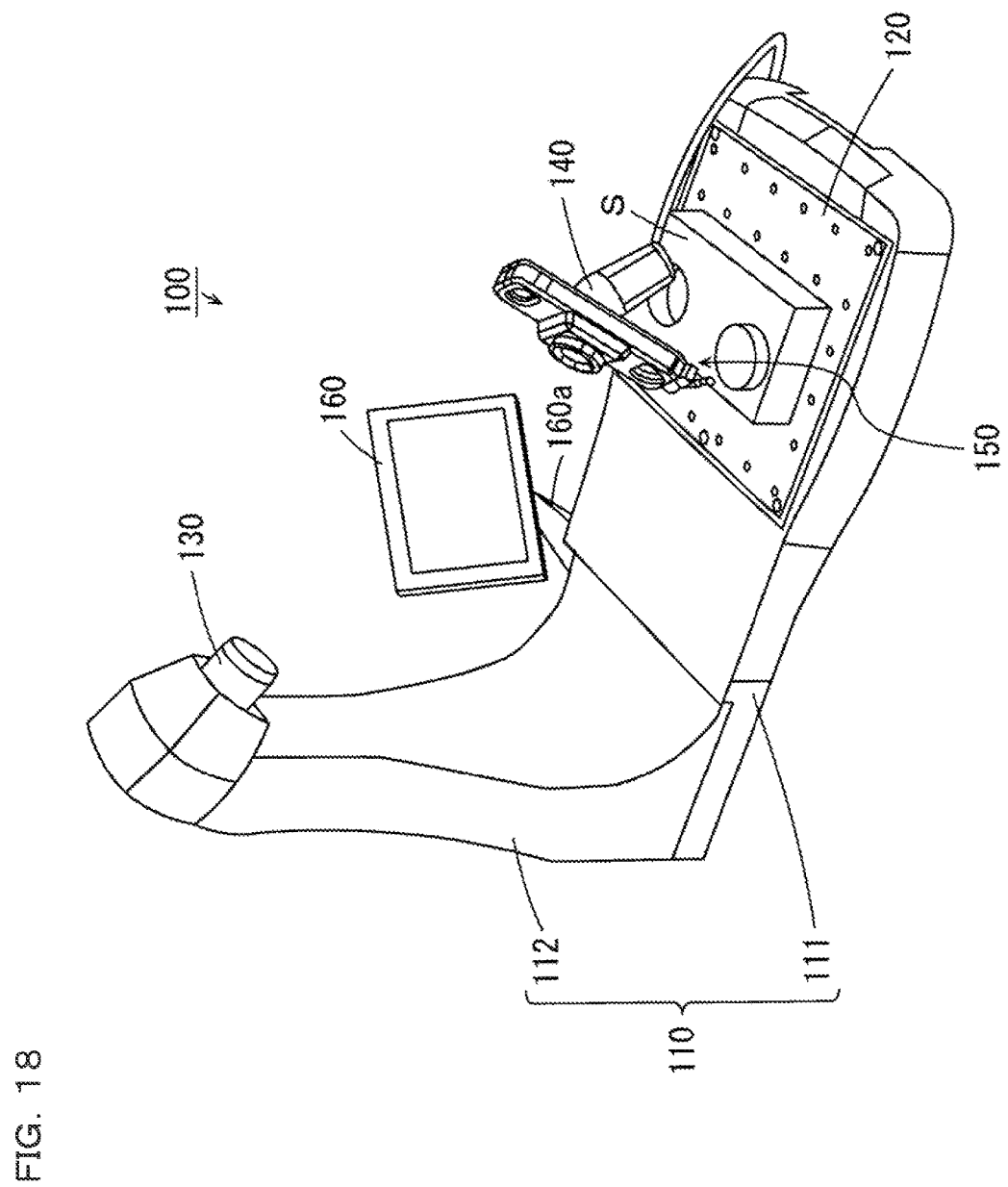
FIG. 18 is a perspective view showing still another arrangement example of the placement table, the main imaging unit, and the display unit.

FIG. 18 is a perspective view showing still another arrangement example of the placement table 120, the main imaging unit 130, and the display unit 160. In the example of FIG. 18, points different from the example of FIG. 2 will be described.

In the example of FIG. 18, instead of providing the display unit 160 between the stand part 112 and the placement table 120, the display unit 160 is provided on the side of the stand part 112 via an attachment part 160*a*. In a plan view, a direction from the placement table 120 toward the main imaging unit 130 and a direction from the placement table 120 toward the display unit 160 form an angle.

Also in this example, the display unit 160 is provided integrally with the placement table 120 and the main imaging unit 130, and hence a measurement result can be easily checked on the display unit 160 without separately preparing a display unit.

As described above, the arrangement of the placement table 120, the main imaging unit 130, and the display unit 160 is not limited, and may be changed as appropriate. Further, the display unit 160 may not be provided on the measurement head 100, and a measurement result may be displayed on a display of a notebook personal computer, a separately prepared liquid crystal display, or the like.

(8-2)

In the above embodiment, the light emitting unit 143 that emits light by means of the LED is used as the marker of the probe 140, whose image is captured by the main imaging unit 130, but the marker of the probe 140 is not limited thereto. For example, a light emitting unit that emits light by means of another light emitting element such as a filament may be used as the marker. A non-light emitting unit having a specific color such as a fluorescent color may be used as the marker. A non-light emitting unit having a specific shape may be used as the marker.

(9) Correspondence Relationship Between Each Constitutional Element of Claims and Each Part of Embodiments Hereinafter, examples of the correspondence between each constitutional element of the claims and each part of the embodiments will be described, but the present invention is not limited to the following examples.

In the above embodiment, the optical coordinate measuring device 300 is an example of the optical coordinate measuring device, the measurement target S is an example of the measurement target, the placement table 120 is an example of the placement table, the light emitting unit 143 is an example of the marker, the contact part 144*a* is an example of the contact part, the probe 140 is an example of the probe, the main imaging unit 130 is an example of the imaging unit, the control unit 220 is an example of the calculation unit, the holding part 110 is an example of the holding part, the grip part 142 is an example of the grip part, the housing 141 is an example of the body part, the first direction D1 is an example of the first direction, the second direction D2 is an example of the second direction, and the display unit 160 is an example of the display unit.

As each constitutional element of the claims, there can also be used other various elements having configurations or functions recited in the claims.

The present invention can be effectively used for measuring sizes and the like of various measurement targets.

What is claimed is:

1. An optical coordinate measuring device comprising:
a placement table for placing a measurement target;
a handheld probe having a plurality of markers and a contact part having a spherical surface offset from a center of the contact part for contacting a measuring point of the measurement target on the placement table;
a memory which stores a marker positional relationship among the plurality of markers and a contact part positional relationship including the center of the contact part with respect to the plurality of markers;
an imaging unit which captures an image including the plurality of markers in the handheld probe, to generate image data corresponding to the image including the plurality of markers;
a base extended from the placement table in a first horizontal direction, and configured to hold the placement table;
a stand integrally coupled with an end of the base, extended in the vertical direction, and configured to hold the imaging unit fixedly directed in obliquely downward such that an image of a region above the placement table is captured by the imaging unit; and
a calculator which calculates a coordinate of a contact position on the spherical surface of the contact part in the handheld probe based on the plurality of markers in the image data generated by the imaging unit, the marker positional relationship and the contact part positional relationship.

2. The optical coordinate measuring device according to claim 1, wherein the imaging unit is arranged obliquely above the placement table.

3. The optical coordinate measuring device according to claim 2, wherein
the handheld probe has
a grip part which is provided so as to extend in a first direction and is gripped by a user, and a body part which is provided at an upper end of the grip part so as to extend in a second direction, the second direction forming an angle with respect to the first direction, and the plurality of markers are provided in an upper surface of the body part.

4. The optical coordinate measuring device according to claim 1, further comprising a display unit, held on the stand and disposed above the base, having a display screen facing obliquely upward, and configured to display a result of calculation by the calculation unit.

5. The optical coordinate measuring device according to claim 1, wherein the placement table is configured such that a fixing tool for fixing the measurement target can be attached to the placement table.

6. The optical coordinate measuring device according to claim 1, wherein the placement table has magnetism.

7. The optical coordinate measuring device according to claim 1, wherein the placement table has adhesiveness.

8. The optical coordinate measuring device according to claim 1, further comprising a display unit held on the stand, and displays a result of calculation by the calculation unit, wherein the imaging unit is configured to a single camera, and both of the display unit and the single camera are held by the stand in the same side of the placement table.

9. The optical coordinate measuring device according to claim 1, wherein the imaging unit captures a plurality of images, each corresponding to the respective measuring point of the measurement target, each including the plurality of markers in the handheld probe, to generate a plurality of sets of image data each corresponding to each of the plurality of images each including the plurality of markers;

the calculator calculates coordinates of contact positions, each corresponding to the respective measuring point of the measurement target, on the spherical surface of the contact part in the handheld probe based on the plurality of sets of markers in the image data generated by the imaging unit, the marker positional relationship and the contact part positional relationship; and the calculator further calculates a measuring result related to a predetermined geometric shape based on the coordinates of the contact positions and the predetermined geometric shape.

10. The optical coordinate measuring device according to claim 9, further comprising a controller which compares each of the measurement results, each related to the respective predetermined geometric shape, with a respective predetermined pass/fail criterion to determine, as a respective pass/fail decision, whether the measuring target has a respective desired shape.

11. The optical coordinate measuring device according to claim 10, wherein the controller further determines, as a synthetic pass/fail decision, whether the measuring target has the desired shape based on the respective pass/fail decisions.

* * * * *